Figure 1:
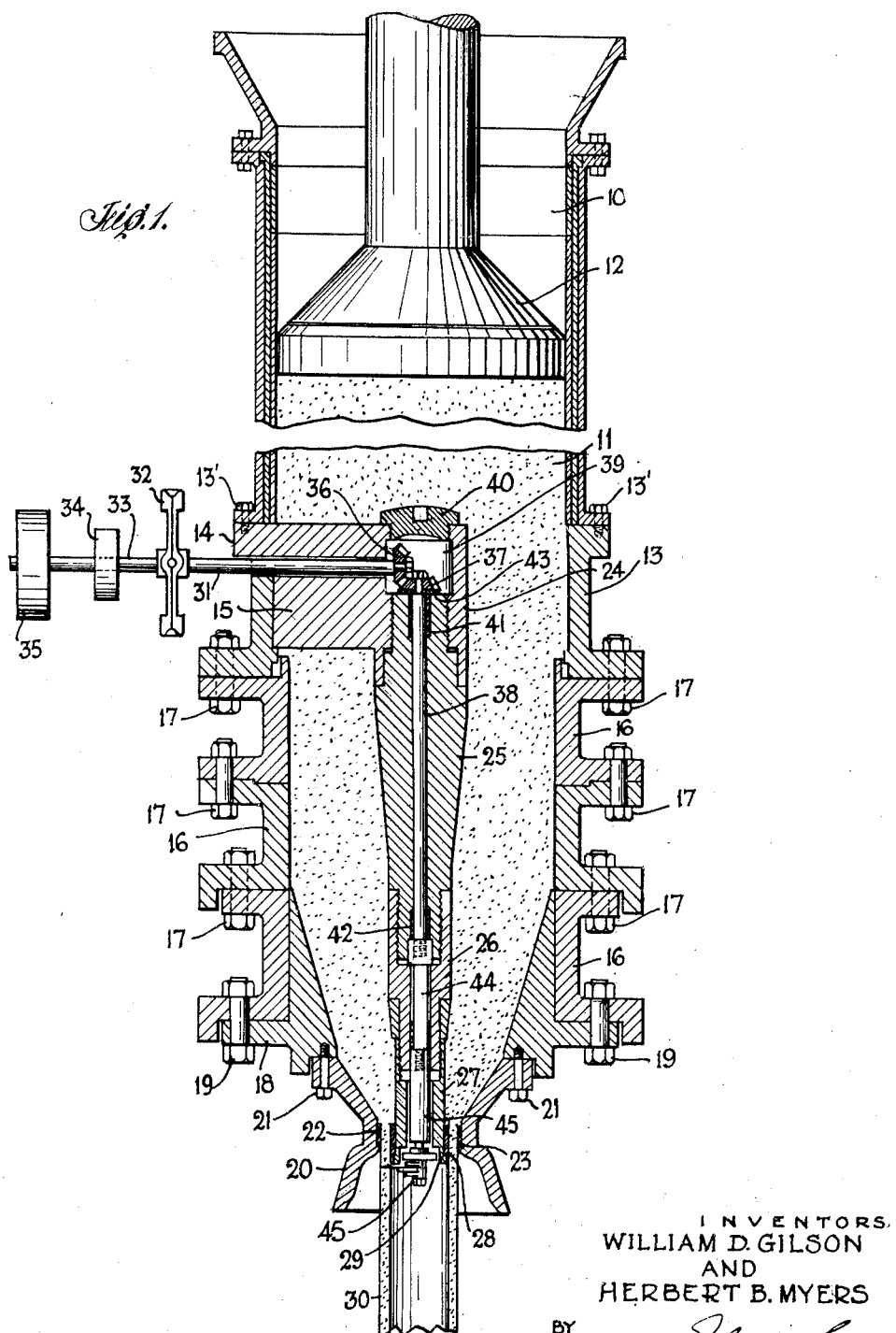

Feb. 14, 1950

W. D. GILSON ET AL 2,497,724

CLAY PIPE CUTTER

Filed Aug. 30, 1946

3 Sheets-Sheet 1

INVENTORS
WILLIAM D. GILSON
AND
HERBERT B. MYERS
BY
Ely & Frye
ATTORNEYS

Feb. 14, 1950 W. D. GILSON ET AL 2,497,724
CLAY PIPE CUTTER
Filed Aug. 30, 1946 3 Sheets-Sheet 2
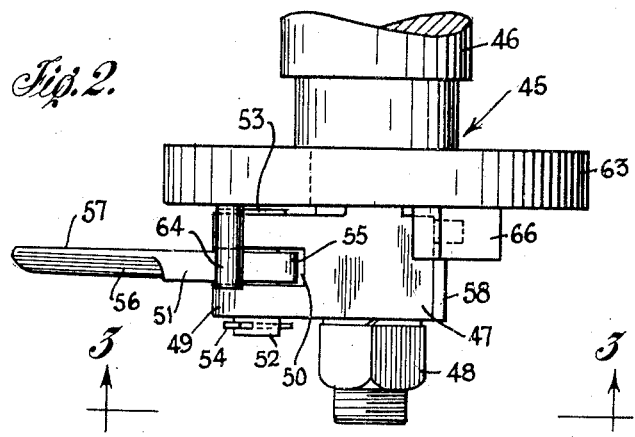
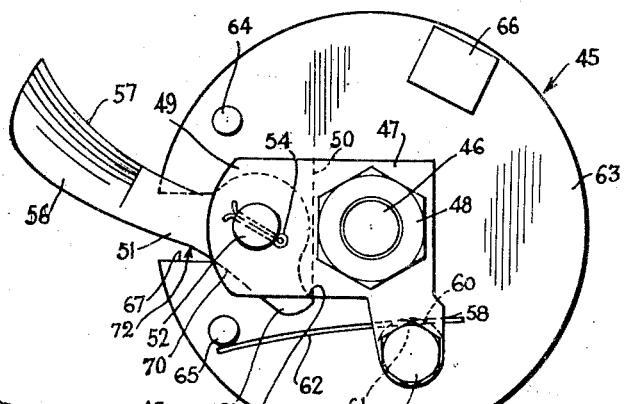
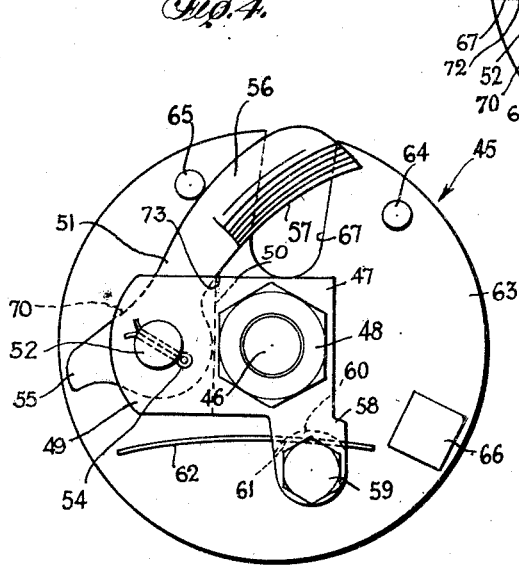
INVENTORS
WILLIAM D. GILSON
AND
HERBERT B. MYERS
BY *Ely & Frye*
ATTORNEYS Feb. 14, 1950 W. D. GILSON ET AL 2,497,724
CLAY PIPE CUTTER
Filed Aug. 30, 1946 3 Sheets-Sheet 3

INVENTORS
WILLIAM D. GILSON
AND
HERBERT B. MYERS
BY Ely & Frye
ATTORNEYS

Patented Feb. 14, 1950

2,497,724

UNITED STATES PATENT OFFICE 2,497,724

CLAY PIPE CUTTER

William D. Gilson and Herbert B. Myers, Akron, Ohio, assignors to The Robinson Clay Products Company, Akron, Ohio, a corporation of Maine Application August 30, 1946, Serial No. 693,958

5 Claims. (Cl. 25—30)

This invention relates to improvements in mechanism for cutting lengths of pipe formed of clay or other plastic material, which pipe is extruded through a die on the lower end of a pipe press.

One of the methods in general use for manufacturing clay pipe involves extruding the clay through a die until the desired length of pipe is obtained, after which the pipe is cut or broken away from the die and subsequently treated in a kiln. When the pipe is to have a bell or socket on one end, this is usually formed on the lower end. It is desirable to have the end of the pipe which is cut or broken away from the die as smooth as possible, since this end is usually interfitted with other lengths of pipe that make up a pipe line.

One of the objects of this invention is to eliminate as much as possible the necessity for breaking the pipe away from the die, and to provide a quickly acting cutting means that will shear or cut off the pipe while leaving a smooth end surface thereon.

Another object is to provide a cutting means which operates from inside the pipe and which when not in use is out of the path of the material being extruded to form the pipe.

A further object is to provide a cutting means comprising one or more cutting blades operated by the inertia of a rotating member or plate which is mounted for rotation both on and with a vertical shaft that is motor driven by the operator when the pipe is ready to be cut.

A further object is to provide means on the inertia plate operable upon rotation of the shaft independently of the plate for positively moving the cutting blades from an inner inoperative position to an outer operative position.

A further object is to provide a mechanism wherein the operating means for the cutting blades on the inertia plate are also operable to hold the cutting blades in an outer operative position while the plate and shaft are rotating together.

A further object is to provide a mechanism wherein the operating means for the cutting blades on the inertia plate are also operable upon rotation of the plate independently of the shaft to return the cutting blades to an inner inoperative position.

A further object is to provide spring means to assist in returning the cutting blades to inoperative position, if desired.

Other objects and advantages will become apparent from the following description taken in conjunction with the accompanying drawings.

Figure 5:
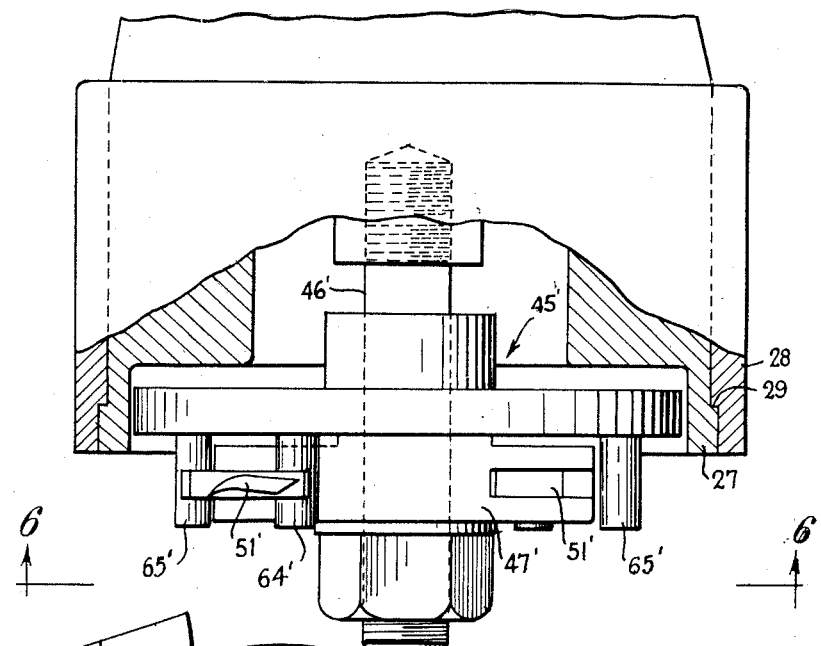
Figure 6:
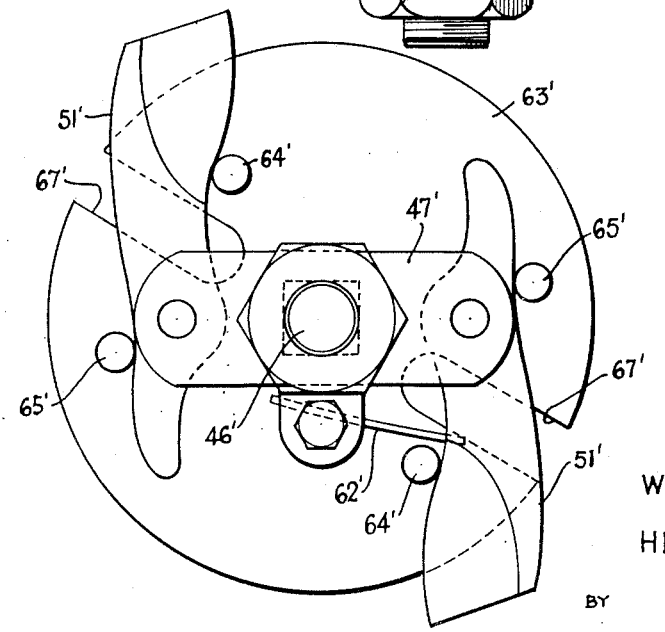

In the drawings:

Fig. 1 is a vertical section through a pipe press showing only the parts thereof necessary to understand the function and operation of the pipe cutter, Fig. 2 is a side elevation of the lower end of the rotating shaft with the inertia plate thereon and having a single cutting blade associated therewith which is in its outer operative position, Fig. 3 is a bottom plan view of the mechanism shown in Fig. 2, as indicated by the line 3—3, Fig. 4 is a view similar to Fig. 3 with the cutting blade in its inner inoperative position, Fig. 5 is a view similar to Fig. 2 with two cutting blades operated by the inertia plate, and Fig. 6 is a bottom plan view of the mechanism in Fig. 5, as indicated by line 6—6.

Referring to Fig. 1 of the drawings, the numeral 10 designates a conventional clay cylinder adapted to receive clay or equivalent material 11 which is forced downwardly by a power operated piston 12 in the usual manner to be extruded into pipe. Below the cylinder 10 is a spider ring 13 bolted or otherwise secured to the cylinder as at 13', and which carries a spider 14, in this instance having three arms 15, one of which is visible in Fig. 1.

Below the spider ring 13, one or more extension rings 16 are provided, which form the area necessary to permit the clay to reunite after passing through the spider before it reaches the dies. The number of extrusion rings 16 utilized may vary as desired, and in this instance three of such rings are shown, having suitable flanges through which bolts 17 or the like may pass to secure the rings 16 to the spider ring 13 and to each other.

The lower ring 16 has a donkey ring 18 bolted thereto as at 19 and tapered to gradually guide or direct the clay toward the dies. A die 20 for forming the outside of the pipe is secured to ring 18 by bolts 21 or the like, and this die carries an annular bushing 22, force fitted into position against a shoulder 23.

Spider ring 13 has a central hub 24 to which is threaded the upper end of a vertical stem 25, the lower end of which receives the threaded upper end of an extension 26. The number of stem extensions 26 may vary depending upon the number of ring extensions 16 utilized, and it is possible that no stem extension will be necessary. In this instance only one extension 26 is required. On its lower end, extension 26 receives the threaded upper end of a die core 27 which forms the inside of the pipe and which carries an annular bushing 28, force fitted into position against a shoulder 29.

The foregoing comprises conventional equipment used in making clay pipe and forms no part of the present invention except in combination with the cutting means to be described. It is believed to be obvious that when the clay is forced through the space between die members 20 and 27 it will be extruded in pipe form, as indicated at 30 in Fig. 1. When it is desired to form a bell or socket on one end of a length of pipe, apparatus of the kind shown in Patent No. 2,282,-282, granted May 5, 1942, to E. K. Hamlen, may be utilized for this purpose.

One of the spider arms 15 has a horizontal drive shaft 31 suitably journaled therein and a universal joint 32 connects one end of this shaft with a cut-off shaft 33 that carries a magnetic clutch 34 and a drive pulley 35 which is adapted to be connected to a suitable source of power such as an electric motor (not shown).

The other end of shaft 31 carries a bevel gear 36 that meshes with a bevel gear 37 carried on the upper end of a vertical driven shaft 38. Said gears rotate in an opening 39 formed in the spider hub 24 and access may be had to them by removing a cap 40 threaded into the upper end of the hub. Shaft 38 is mounted for rotation in the stem 25, suitable bearings 41 and 42 being provided therein, and a thrust bearing 43 is arranged between gear 37 and the upper end of stem 25.

Shaft 38 is threaded on its lower end and terminates a little short of the lower end of stem 25, the arrangement being such that a shaft extension or the upper end of a cutting unit may be threaded to the shaft. In this instance, since the stem 25 has one extension 26 secured thereto, it is necessary to have one shaft extension 44 journaled in this stem extension, with the upper end of the cutting unit, indicated as a whole by the numeral 45, threaded on the lower end of shaft extension 44. Obviously, as many shaft extensions 44 may be utilized as required to bring the cutting unit 45 into proper position to cut off the pipe after it has been formed and is of the desired length. Fig. 1 shows the preferred location of the cutting unit 45 within the die member 20 and just below the die member 27.

Referring to Figs. 2, 3 and 4, the cutting unit 45 comprises a shaft portion 46 which is threaded to the shaft extension 44 so as to be rotated whenever shaft 31 is operated. Adjacent its lower end, the shaft portion 46 is reduced and squared so as to carry a lug 47 held thereon by a nut 48, so that the lug will turn whenever the shaft portion turns. One arm 49 of lug 47 is bifurcated as at 50 (Fig. 2) to pivotally receive a knife or cutting blade 51, mounted therein on a pivot pin 52 held in place by its enlarged upper end 53 (Fig. 2) and by a cotter pin 54 passing through its lower end. It will be observed that the blade 51 is pivoted intermediate its ends so as to provide a short arm 55 and a long arm 56, the latter being sharpened on one edge, as at 57.

The other arm 58 of lug 47 also carries a pin 59 which has an enlarged cap 60 threaded on its upper end, and which is slotted at 61 to firmly receive one end of a flat spring 62 that is slightly bowed, as indicated in Figs. 3 and 4.

Mounted for limited turning movement on shaft portion 46, above lug 47, is an annular inertia plate 63, carrying a pair of spaced, depending pins 64 and 65, and a counterweight 66. Pins 64 and 65 are arranged to strike and to be struck by the blade 51 under conditions to be described, and pin 65 is also arranged to contact one end of spring 62. The plate 63 also has a radial slot 67 therein, which when in the position shown in Fig. 3, permits ready access to the pivot pin 52, thus making it easy to place or remove the latter pin through this slot.

Assuming now that the parts of the cutting unit are in the position shown in Fig. 4, which is the inner inoperative position of the blade 51 when the drive and driven shafts are not in operation, and in which position the blade 51 is inside the pipe 30 being extruded. The operator then starts the shafts in motion by suitable means (not shown) such as an electric push button or hand lever. Rotation of the shaft portion 46 will be clockwise, as viewed in Fig. 4, and lug 47, blade 51 and spring 62 will also move in the same direction. Since plate 63 is mounted for rotation on portion 46, this plate will not move initially and its inertia will tend to keep it in its initial position.

As the blade 51 moves with the shaft portion 46, the cutting edge 57 will first strike pin 64, which will deflect the blade outwardly until the pin 65 strikes the short arm 55 at about the point 70, after which pin 65 will give added impetus to the pivotal movement of the blade, forcing it farther outwardly and through the wall of the pipe being cut. After the blade strikes the pipe wall, the resistance of the latter causes it to turn to its full outward position, indicated in Fig. 3, wherein further pivotal movement of the blade is prevented by the short arm 55 engaging the lug 47 at point 71 (Fig. 3). Just prior to the time blade 51 reaches its Fig. 3 position, pin 65 will contact spring 62, and after tensioning or cocking this spring slightly, no further relative movement between the shaft portion 46 and plate 63 is possible, so that this plate will thereafter rotate in unison with shaft portion 46, and the blade will remain in its outer operative position to quickly sever a length of pipe.

In actual operation the rotation of the shafts and cutting unit is relatively rapid and only a few seconds are required before the cutting operation is completed. It is then necessary to quickly return the blade to its inner position so that it is out of the path of the next length of pipe to be extruded.

The return movement of the blade is accomplished by first stopping the rotation of the operating shafts. This will cause the shaft portion 46 to stop rotating, but the inertia of plate 63 tends to keep it rotating on portion 46, and the slight tensioning or cocking action of spring 62 against pin 65 supplements the inertia of plate 63. Thus, as this plate continues to rotate, pin 65 will strike the long arm 56 at about point 72 (Fig. 3), moving the blade inwardly until it reaches the position shown in Fig. 4, where pin 65 becomes in effect a locking pin which cooperates with the portion 73 (Fig. 4) of lug 47, to prevent further movement of the plate and blade.

Figs. 5 and 6 show a modified type of cutting unit wherein two cutting blades are utilized. In this embodiment the cutting unit 45' is also adapted to be connected to a driven shaft or shaft extension as explained in connection with the single blade, and to have its blades located slightly below the core die 27, as indicated in Fig. 5.

The double unit comprises a shaft portion 46' carrying a fixed lug 47', which in this instance is bifurcated on two ends to receive oppositely disposed, pivotally mounted cutting blades 51', and has an intermediate arm that carries the flat spring 62'. An inertia plate 63' is also provided and carries two sets of spaced depending pins 64' and 65', one set for each blade, respectively. Also, a pair of radial slots 67' are provided in plate 63' to permit access to the pivot pins for the blades.

The operation of the double unit is substantially the same as the single unit, relying on the inertia of the plate 63' and the action of the pins 64' and 65' to move the cutting blades in and out. However, only one spring 62' is needed and this can be tensioned or cocked by any of the pins. As shown in Fig. 6, this spring is arranged to be contacted by one of the pins 64'.

It is believed to be apparent that we have provided a novel arrangement in both the single and double units which will readily achieve the objects and advantages set forth.

While we have shown preferred embodiments of the invention, it will be understood that it is not limited to these embodiments, and that modifications and changes may be made therein without departing from the spirit of the invention or from the scope of the subjoined claims.

What is claimed is:

1. In a cutting unit of the character described, a rotatable shaft member, an inertia member mounted for rotation both on and with said shaft member, a cutting blade pivotally mounted on said shaft member, and means carried by said inertia member for pivoting said blade to an inner inoperative position when said inertia member is rotated relatively of said shaft member, said means comprising a pair of spaced pins arranged to contact opposite sides of said blade, and spring means engaging at least one of said pins to assist said pins in pivoting said blade to an inner inoperative position.

2. In a cutting unit of the character described, a rotatable shaft member, an inertia member mounted for rotation both on and with said shaft member, a cutting blade pivotally mounted on said shaft member, and means carried by said inertia member for first pivoting said blade to an outer operative position when said shaft member is rotated relatively of said inertia member, and for then pivoting said blade to an inner inoperative position when said inertia member is rotated relatively of said shaft member, said means comprising a pair of spaced pins arranged to contact opposite sides of said blade, and spring means engaging at least one of said pins to assist said pins in pivoting said blade to an inner inoperative position.

3. In a cutting unit of the character described, a rotatable shaft member, an inertia member mounted for rotation both on and with said shaft member, a pair of oppositely disposed cutting blades mounted on said shaft member, and a pair of pins for each blade carried by said inertia member, at least one pin of each pair being arranged to first move its cooperating blade to an outer operative position when said shaft member is rotated relatively of said inertia member, and to thereafter move its cooperating blade to an inner inoperative position when said inertia member is rotated relatively of said shaft member, and spring means engaging at least one of said pins to assist said pins in pivoting said blades to an inner inoperative position.

4. In a clay cutter of the character described, the combination of extruding and die means to form said clay into pipe, with a cutting unit arranged to sever said pipe in desired lengths, said unit comprising a rotatable shaft member, an inertia member mounted for rotation both on and with said shaft member, a cutting blade pivotally mounted on said shaft member, and means carried by said inertia member for first pivoting said blade into the path of travel of said pipe when said shaft member is rotated relative of said inertia member, and for then pivoting said blade out of the path of travel of said pipe when said inertia member is rotated relatively of said shaft member, said means comprising a pair of spaced pins arranged to contact opposite sides of said blade, and spring means engaging at least one of said pins to assist said pins in pivoting said blade out of the path of travel of said pipe.

5. In a clay cutter of the character described, the combination of extruding and die means to form said clay into pipe, with a cutting unit arranged to sever said pipe in desired lengths, said unit comprising a rotatable shaft member, an inertia member mounted for rotation both on and with said shaft member, a pair of oppositely disposed cutting blades mounted on said shaft member, and a pair of pins for each blade carried by said inertia member, at least one pin of each pair being arranged to first move its cooperating blade into the path of travel of said pipe when said shaft member is rotated relatively of said inertia member, and to thereafter move its cooperating blade out of the path of travel of said pipe when said inertia member is rotated relatively of said shaft member, and spring means engaging at least one of said pins to assist said pins in pivoting said blades out of the path of travel of said pipe.

WILLIAM D. GILSON.
HERBERT B. MYERS.

REFERENCES CITED

The following references are of record in the file of this patent:

UNITED STATES PATENTS

| Number | Name | Date |
|---|---|---|
| 1,651,205 | Hibbins | Nov. 29, 1927 |
| 2,200,172 | Howard | May 7, 1940 |